April 20, 1926.
J. A. STREUN
COTTON SEPARATOR
Filed March 12, 1925
1,581,363
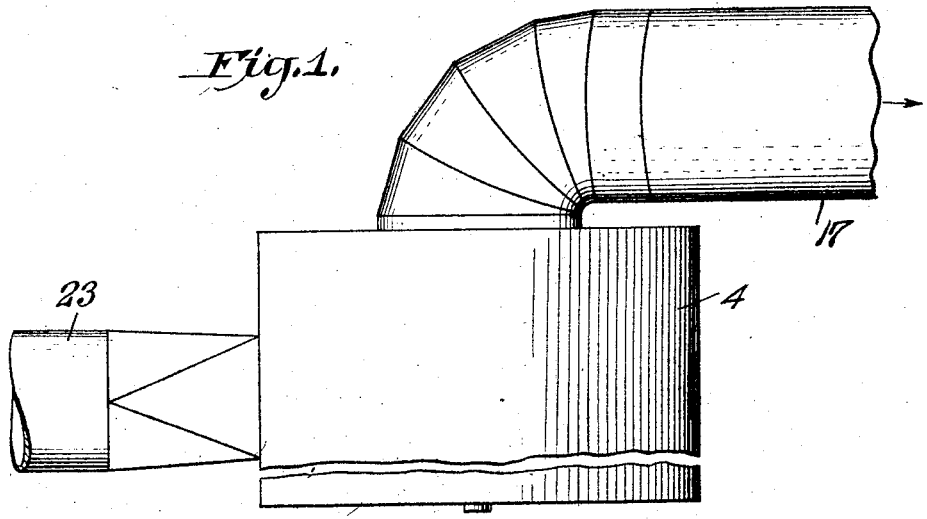
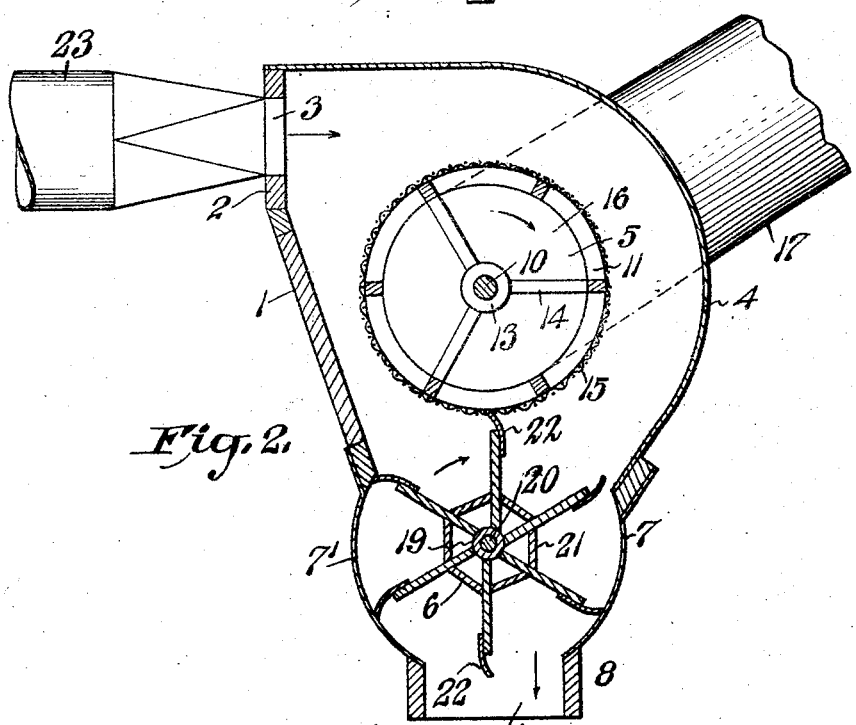

Patented Apr. 20, 1926.

1,581,363

UNITED STATES PATENT OFFICE.

JOHN ARNOLD STREUN, OF SHERMAN, TEXAS.

COTTON SEPARATOR.

Application filed March 12, 1925. Serial No. 15,065.

*To all whom it may concern:*

Be it known that I, JOHN ARNOLD STREUN, a citizen of the United States, residing at Sherman, Texas, have invented a certain new and useful Improvement in Cotton Separators, of which the following is a specification.

My invention relates to a cotton separator for use on cotton gins.

An object of the invention is to provide a particularly simple and efficient type of cotton separator adapted to separate the dirt and chaff from the cotton before it is fed to the gin. It is another object of the invention to provide a pneumatically operated separator composed of few and simple parts which will be cheap to manufacture and which will last for long periods of time.

Referring to the drawing herewith Fig. 1 is a top plan view of the housing in which the device is mounted, and Fig. 2 is a vertical section through the device illustrating the position of the various parts. Like numerals of reference are employed to designate like parts in both the views.

My improved separator comprises a housing properly shaped to house the operating rollers. It comprises a forward wall 1 which is inclined slightly forward at its upper end and connected with the vertical portion 2, formed with a central opening 3 therein to allow the entrance of air thereto.

The upper rearward wall 4 of the housing is curved to conform to the shape of a central cylinder 5 and is spaced therefrom a suitable distance to allow the passage of the cotton between said wall and the cylinder. The lower end of the wall 4 is connected to a curved section 7, which is rounded to conform to the shape of the feeder 6 therein. The front wall 7' also conforms to the shape of the feeder. Below the feeder housing the walls are extended directly downwardly to form an outlet 9 leading toward the gin.

The end walls of the housing are plane vertical sides and furnish a mounting for the cylinders therein. The upper cylinder 5 is mounted upon a shaft 10, rotatable at its ends within the housing. Its frame comprises a series of annular supports 11 mounted upon longitudinal members 12, of a length sufficient to fit closely within the housing. The cylinder frame is connected to the hub 13 upon the shaft 10 by means of radial spokes 14. The frame work of the cylinder thus provided is covered by a sheet of foraminous material 15, which may preferably be wire screen, but which obviously may be any equivalent therefor.

At one end of the rotatable cylinder 5 the wall of the housing is formed with an opening 16 therein, and said opening is connected directly with a chute or pipe 17 leading to some point of discharge for the dirt and chaff from the cotton.

The feeder member 6 is mounted in the housing directly below the cylinder 5 between the opposite walls 7 and 7'. It is formed of radial flights 18 secured upon the hub 19 of the shaft 20, said shaft being mounted for rotation in the end walls of the housing. The flights are mounted approximately tangent to the shaft 20 as will be noted in the drawing. These flights are supported in position by means of longitudinal brace members 21 fitting between the said flights at a point spaced slightly from their inner ends and the effect of this construction is to provide a polygonal roller having approximately radial blades projecting therefrom. At the ends of said blades are secured longitudinal strips of leather or rubber or some composition flexible in its nature and adapted to withstand wear. These strips 22 projecting beyond the ends of the blades 18 have contact closely with the walls 7 and 7' of the housing. At the upper side of the feeder cylinder the strips 22 rub against the lower surface of the rotating cylinder 5 as shown in Fig. 2.

In the operation of this device the outlet-chute 17 is connected to a suction fan. The cotton is fed to the housing through the opening 3 by way of a pipe 23 connected with said opening. A suction produced within the housing 4 through the pipe 17 will be sufficient to draw the cotton through the constricted opening 3 with some velocity, carrying the cotton across the upper side of cylinder 5, against the curved wall 4. The cotton will thus be agitated and broken up so as to release the dirt and chaff which will be drawn through the walls of the cylinder 5 and be carried away through the suction pipe 17.

The cylinder 5 is rotatable in a clockwise direction as seen in Fig. 2, thus tending to carry the cotton downwardly between said cylinder and the wall 4. This will feed the cotton from which the dust and chaff have been eliminated, to the feeder roll 6. The said roll is rotatable in the same direction as is the cylinder 5. The strips 22 will engage with the lower surface of the cylinder 5 and act to remove the cotton therefrom so that it will be carried downwardly past the feeder roll within the pockets between the adjacent blades and fed out through the opening 9. There will be no inlet for the air from below the feeder roll 6 and the said roll may be rotated at any desired speed to cause a slight suction downwardly so as to better feed the cotton from the separator to the distributor.

It will be noted that the construction of the device is exceedingly simple and effective. It will be therefore economical to manufacture and will not be liable to be out of order. It is, therefore, particularly desirable for the purpose for which it is designed.

Having thus described my invention, what I claim as new and desire to protect by Letters Patent is:

1. A cotton separator comprising a housing, a screened cylinder therein, having its interior unobstructed to allow passage of air transversely thereof, a suction pipe connected with the housing at one end of said cylinder, an inlet pipe an outlet, and a single feeder roll closing the outlet below said cylinder having means thereon to remove the cotton from said cylinder and feed it downwardly from said housing.

2. A separator for cotton comprising a housing, having an opening at one end thereof, a suction pipe connected with said opening, a cylinder mounted in said housing said cylinder spaced freely from the walls thereof and having one end thereof registering with said opening, the walls of said cylinder being foraminated, an inlet pipe connected with the upper end of said housing at one side thereof above said cylinder, a feeder roll below said cylinder and rotatable in said housing, strips of flexible material on said feeder roll adapted to contact with the walls of said housing on both sides thereof and to remove the cotton from said cylinder in the manner described.

3. A cotton separator comprising a housing, a cylinder mounted rotatably therein, out of contact with said housing, said cylinder having a foraminated outer wall thereon, an unobstructed interior, an inlet pipe connected with the side of said housing above said cylinder, a curved wall on said housing opposite said inlet pipe, a feeder roll below said cylinder adapted to remove the cotton from said cylinder and suction means connected with one end of said cylinder.

4. A cotton separator comprising a housing having an inlet opening therein on one side, a curved wall opposite said opening, a foraminated cylinder rotatable in said housing below said opening, and out of contact with said housing, a suction pipe connected with said housing at the end of said cylinder, a feeder roll fitting between the walls of said housing below said cylinder, and means on said feeding roll to wipe the cotton from said cylinder and discharge it from said housing.

5. A cotton separator comprising a housing, an inlet chute for cotton connected therewith at the upper end thereof, a suction pipe connected with one end of said housing below said chute, a rotatable foraminated cylinder in said housing spaced from the side walls thereof and registering with said suction pipe at one of its ends, a feeder roll closing said housing below said cylinder and adapted to rotate in the same direction as said cylinder, and remove the cotton from said cylinder in the manner described.

In testimony whereof I hereunto affix my signature this 6 day of March, A. D. 1925.

JOHN ARNOLD STREUN.